E. C. STEPHENS.
AUTOMATIC-GATES.
No. 182,866. Patented Oct. 3, 1876.
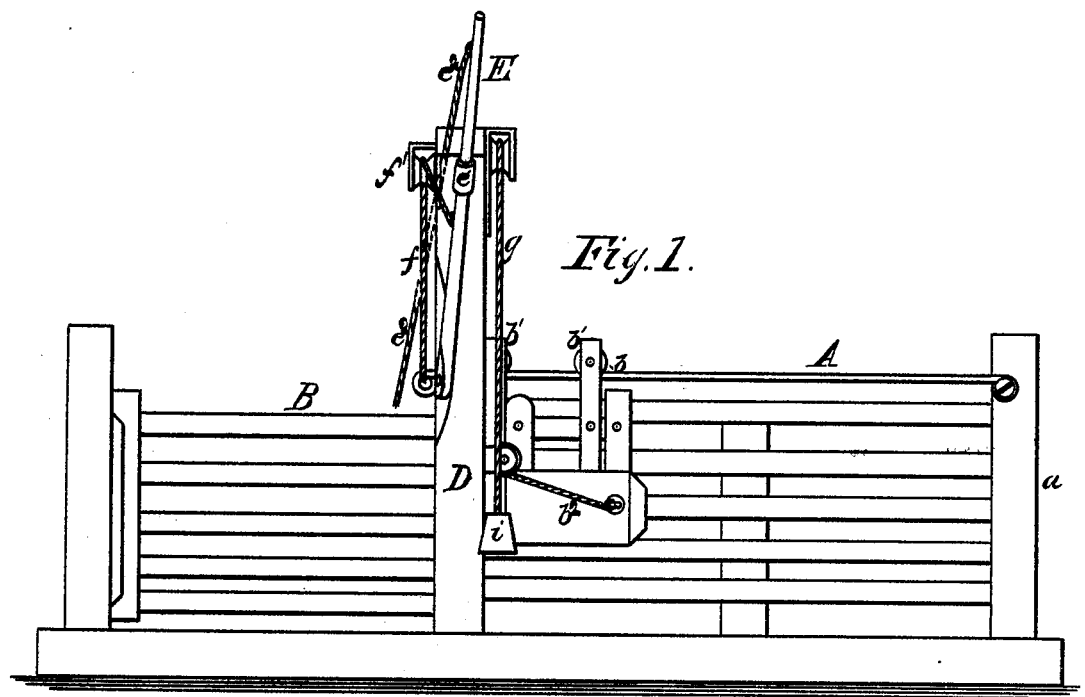
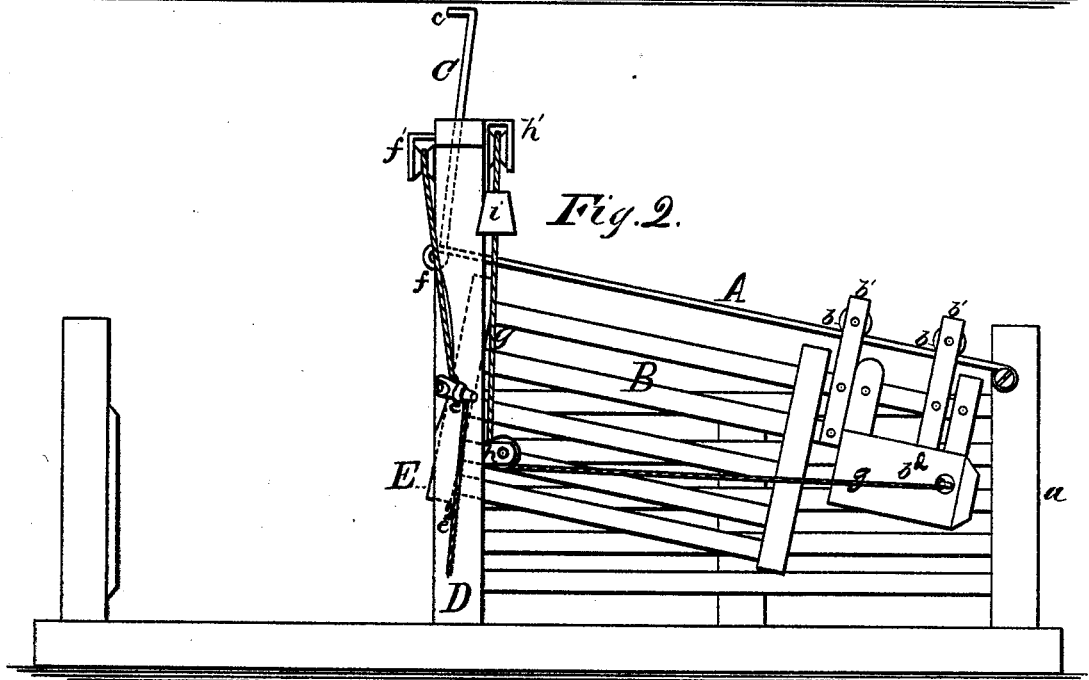
WITNESSES
INVENTOR
Elijah C. Stephens
By Lafayette Bingham &c.
ATTORNEYS

UNITED STATES PATENT OFFICE.

ELIJAH C. STEPHENS, OF ALBIA, IOWA.

IMPROVEMENT IN AUTOMATIC GATES.

Specification forming part of Letters Patent No. 182,866, dated October 3, 1876; application filed August 3, 1876.

*To all whom it may concern:*

Be it known that I, ELIJAH C. STEPHENS, of Albia, in the county of Monroe and State of Iowa, have invented certain new and useful Improvements in Gates; and I do hereby declare that the following is a full, clear, and exact description thereof, which will enable others skilled in the art to which it pertains to make and use the same, reference being had to the accompanying drawings, and to the letters of reference marked thereon, which form a part of this specification, and in which—

Figure 1 is a side view of my improved gate closed, and Fig. 2 is a similar view of the same opened.

Corresponding parts in the two figures are designated by like letters.

This invention relates to a certain improvement in gates; and it consists in opening the gate by elevating it upon an inclining rod or bar, which causes the elevated gate to descend to one side of the opening or gateway. When the elevating-levers are released the inclined rod will descend to its normal or horizontal position, and the gate be returned to its closed position by weights, substantially as hereinafter more fully set forth.

In the annexed drawings, A refers to a rod or bar pivoted to a post, $a$, and supporting one end of the gate B, the said end of gate having pulleys $b\ b$ connected thereto by overhanging L-shaped plates or loops $b^1\ b^1$ and traveling upon the rod or bar A. This end of the gate is also weighted, as seen at $b^2$, the office of which will be hereinafter referred to. The inner or free end of the elevating rod or bar A is connected or jointed to a second rod or bar, C, extending up between the two posts D D, between which the gate is hung, and through the piece connecting their upper ends together to support and guide that end of the rod A, and permit of its upward movement.

The upper end of the supporting rod or bar C is bent at right angles, as at $c$, to cause it to catch upon the upper side of the connecting-piece of the gate-posts D D, and thus be suspended.

E E are two levers, one upon each of the gate-posts D D, to permit of the gate being opened from either side thereof, a cord or other similar connections, $e\ e$, depending therefrom within convenient reach of the operator or person upon horseback or in vehicle. To assist the descent of the levers E E as the gate is elevated, they are suitably weighted, as at $e'\ e'$, relieving the effort of the operator in opening the gate. These levers are connected to the inner or looped end of the elevating rod or bar A by cords or other suitable means $f\ f$ passing over pulleys $f'\ f'$ attached to the gate-posts D D. The outer or weighted end $b^2$ of the gate has attached to it cords $g\ g$ passing over pulleys $h\ h'$ upon the gate-posts D D, and connected to weights $i\ i$.

The operation of my invention is as follows: Depress the lever or levers E E, when the gate B will be elevated and the rod or bar A inclined, the weighted or outer end $b^2$ of the gate counterbalancing the weights $i\ i$, allowing or causing the gate to descend the rod A to the position indicated in Fig. 2, thus opening the gate.

The elevating-levers E E being released, the weight of the gate will cause the inclined rod A to immediately descend to its normal or horizontal position, simultaneously elevating the said levers, as seen in Fig. 1, after which the weights $i\ i$ will cause the gate to commence to travel the rod or bar A, and be returned to its closed position. (See the latter-mentioned figure.)

Having thus described my invention, what I claim, and desire to secure by Letters Patent, is—

1. In combination with the sliding gate B, the pivoted rod A and guide-rod C, provided with a shoulder, $c$, the operating mechanism, substantially as and for the purpose set forth.

2. The combination, with the gate B, rods A C, levers E E, cords $f\ g$, and pulleys $f'\ h\ h'$, of the weighted cord $g\ i$, substantially as specified.

In testimony that I claim the foregoing as my own I affix my signature in presence of two witnesses.

ELIJAH C. STEPHENS.

Witnesses:
 JOHN S. TOWNSEND,
 JAMES M. ROBB.